United States Patent Office 2,831,163
Patented Apr. 15, 1958

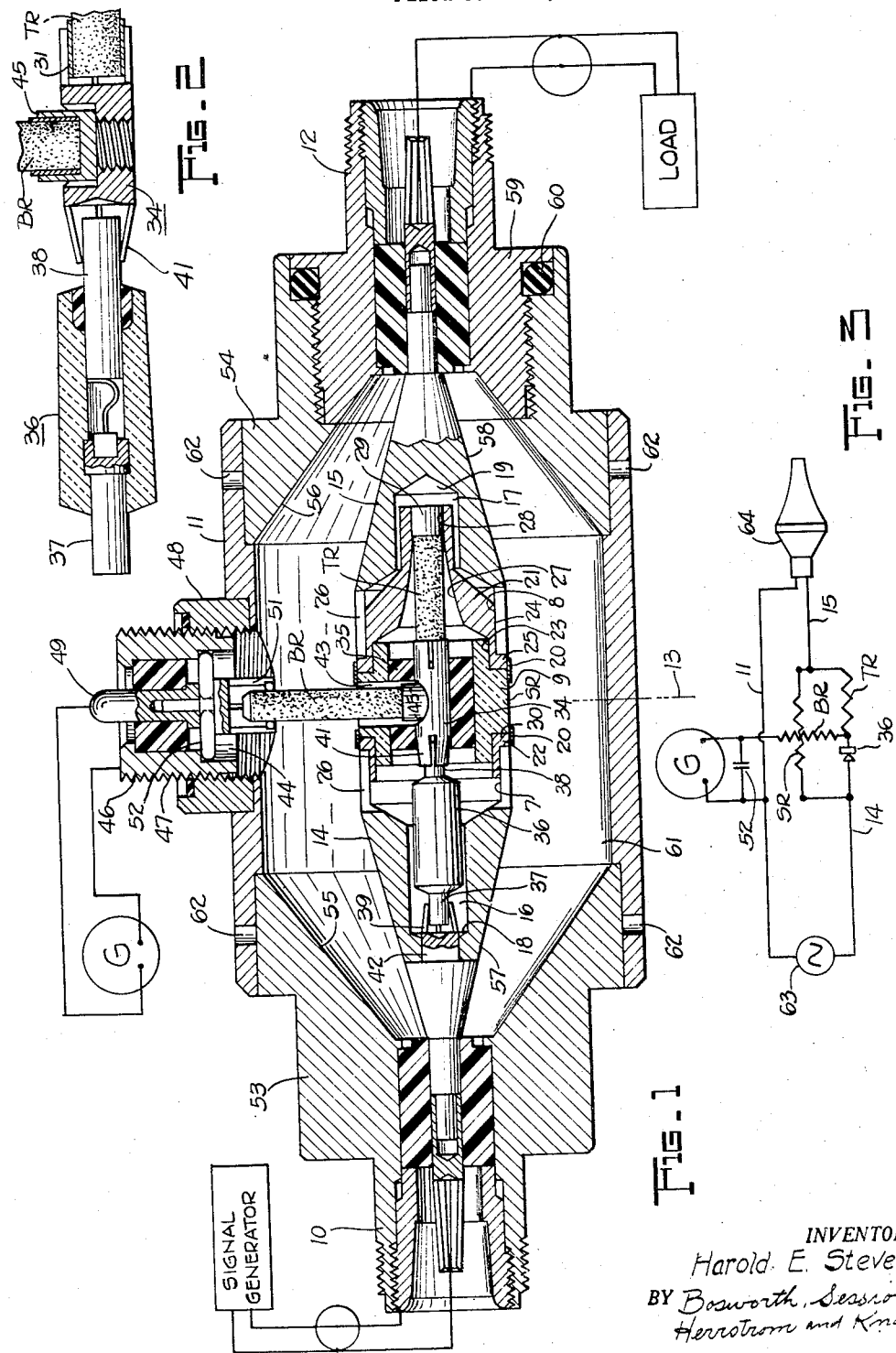

2,831,163

UNIDIRECTIONAL SAMPLING DEVICE FOR INSERTION IN HIGH FREQUENCY COAXIAL ELECTRICAL TRANSMISSION LINE

Harold E. Stevens, Lyndhurst, Ohio, assignors to Bird Electronic Corporation, Cleveland, Ohio, a corporation of Ohio Application January 30, 1957, Serial No. 637,307

6 Claims. (Cl. 324—95)

This invention relates to indicators or meters for high frequency electrical energy and more particularly for the sampling of wave energy transmitted along a coaxial line.

An object of the invention is to provide an improved type of hollow center conductor and a mounting arrangement for a rectifier and sampling resistor in a center conductor for use in an insertion type measuring unit.

A further object is to provide an improved center conductor structure suitable for a non-frequency selective coupler or sampler.

A further object is to provide an improved uni-directional sampling device for insertion in high frequency coaxial electric transmission lines.

Other and further objects, features and advantages of the invention will become apparent as the description proceeds.

A center conductor means constituting the subject matter of this application is suitable for use in insertion devices of the general type described in the co-pending application of James R. Bird and Harold E. Stevens, Serial No. 224,762, filed May 5, 1951.

In insertion meters, the measurement of electrical quantities such as standing wave ratio, power, voltage or current in a radio frequency system is accomplished by rectifying a sample of the radio frequency energy and directing the rectified sample of energy through a direct-current measuring or indicating device or circuit externally of the coaxial line unit which has been inserted in the radio frequency system.

One of the features of the measuring arrangement of insertion meters such as described in the aforesaid Bird and Stevens application is the mounting of the rectifier within the center conductor of the insertion unit to minimize radio frequency inductive or interference effects between the radio-frequency and direct-current circuits. Accordingly, connections for the direct-current electrical circuit are brought across the space between the outside and center conductors of the insertion unit. In measuring current or power, a series resistor is included in the radio-frequency circuit of the center conductor, which must also be included in the direct-current circuit.

In order to obtain a response in a direct-current circuit which most faithfully represents the actual magnitude of the radio-frequency quantity, it is desirable to make the direct-current connections physically as close to the sampling resistor as possible. Accordingly, in accordance with the present invention, the sampling series resistor is made annular in form, being interposed in a section of the center conductor of the insertion unit, and is provided with a radial aperture through which a direct-current connection is made.

Furthermore, in order to obtain a structure of the utmost simplicity, durability and reliability for uni-directional sampling of radio-frequency wave energy, a single direct-current connection is brought across the space between the outside and center conductors through a radial bridging resistor substantially at the center of the insertion unit, to a direct-current coaxial connector unit mounted on the outside conductor.

A better understanding of the invention will be afforded by the following detailed description considered in conjunction with the accompanying drawing, in which Fig. 1 is a view of a longitudinal section of an insertion device according to the invention represented as cut by a plane passing through the axis thereof, with a schematic representation of electrical circuit connections;

Fig. 2 is an enlarged fragmentary sectional detail showing the contact fitting and related parts located within the hollow center conductor of the main coaxial line; and Fig. 3 is a schematic circuit diagram of the internal elements of the device of Fig. 1 together with the external circuit connections.

Like reference characters are utilized throughout the drawings to designate like parts.

The form of insertion unit illustrated in Fig. 1 comprises an outside conductor 11, a center conductor means and conventional coaxial line connector units 10 and 12 at the ends, the units 10 and 12 being alike and the outside conductor being symmetrical with respect to an imaginary transverse center plane 13 so that the unit may be turned end for end.

The center conductor means comprises separate conductor rods 14 and 15 and a series resistor SR electrically joining the conductor rods 14 and 15 at the center of the unit. The conductor rod 14 and likewise the conductor rod 15 have cylindrical chambers 16 and 17 each with a counterbored outer end portion 7, 8, respectively, the chambers being arranged with open ends toward each other and with closed ends 18 and 19. The chambers 16 and 17 together form a hollow region or central chamber of the center conductor means for receiving a tubular ceramic insulator 9 which carries the series resistor SR and for receiving in each chamber supplementary circuit elements for connection to an external indicator such as a d'Arsonval galvanometer or similar direct-current instrument G.

There is a terminating resistor TR mounted in the chamber 8, 17 within a conductor element 21 which latter may take the form of a metal turning of brass, or the like, coaxial with the terminating resistor TR and the center conductor rods 14 and 15.

The series resistor SR is in the form of a thin conductive film deposited or otherwise applied about the central cylindrical portion of a tubular ceramic insulator 9. The resistor thus takes the form of an annulus providing peripherally arranged resistor material, the insulator 9 being of circular section and having reduced diameter end portions as described in greater detail in the co-pending application, Serial No. 637,306, filed January 30, 1957 (filed concurrently herewith). The reduced diameter end portions of the insulator fit within the counterbored ends of the conductor rods 14 and 15 or, as shown, within shouldered sleeves, ferrules or similar conductive elements mounted therein. A tapered portion 27 of the conductive element 21 and the terminating resistor TR form a reflectionless termination of a minor coaxial line located within the center conductor rods 14 and 15. In the structure illustrated, the conductor or horn element 21 has a counterbore 23 of such diameter as to receive a reduced diameter end of the insulator 9 which carries the series resistor annulus SR, an outer cylindrical surface 24 of such diameter as to fit within the counterbore 8 at the open end of the chamber 17, and an end flange or rim 25 for locating the conductor element or horn 21 coaxially within the chamber 17. The external diameter of the flange 25 conforms to the diameter of the series resistor SR, and to the external diameter of the end portions of the conductor rods 14 and 15, so as to form a smooth cylindrical surface for the central portion of the center conductor rod means of the main line to avoid electrical discontinuities.

The large ends of the conductor rods 14 and 15 are directed toward one another and may be slotted axially as represented at 26 for resiliently securing the horn member 21 in place and resiliently securing a ferrule 22 which, circumferentially flanged at 30 about one end, is fitted over one reduced diameter end of the insulator 9 which carries the series resistor SR. The ferrule element 22 and the conductive element 21 are mechanically secured to the insulator 9 as by cement.

For assuring good electrical contact between the resistive film SR and the tubular ferrule 22 and conductor 21 elements, peripheral conductor banks 20, such as bands of silver paint or the like, may be coated around the junctions of the annular resistor SR with the flange 30 of the ferrule 22 and the flange 25 of the conductor element 21. The curve of the tapered portion 27 of the bore in the element 21 is determined in the manner disclosed in U. S. Patent No. 2,552,707, issued May 15, 1951, in order to obtain a reflectionless termination with the resistance of the termination resistor TR according to the characteristic impedance of the radio frequency apparatus with which the elements are used.

As shown, the larger diameter end of the bore is at the counterbore 23 for electrical contact with the adjacent end of the annular resistor SR. The bore tapers to a minimum diameter at the outer end 28 for receiving a silver-conductive-banded end 29 of the terminating resistor TR. The inward end of the terminating resistor TR is also provided with a conductive band 31 which is connected electrically to a contact fitting 34 mounted within an annular insulator 35 which is in turn mounted within the annular insulator 9 carrying the resistor SR for insulatingly supporting the contact fitting 34 within the center of the annular resistor. The terminating resistor TR may constitute a conventional ceramic rod with a resistive coating thereon extending between the conductive bands 29 and 31. The fitting 34 of generally circular section is formed with a cylindrical end socket into which the conductive band 31 is snugly received.

For producing a direct-current sample of radio-frequency wave energy appearing in the series resistor SR and the terminating resistor TR, a rectifier 36 is mounted in the chamber 16 electrically connected at one end to the contact fitting 34 and at the other end to a suitable connection for an external direct-current circuit. As shown, the rectifier 36 is connected between the connection fitting 34 and the conductor rod 14, the externally connected radio frequency apparatus being relied on for providing the return direct-current connection. The rectifier 36 may be of the conventional tubular type having aligned end terminal pins 37 and 38 mechanically mounted within and electrically connected to socket contacts 39 and 41 on a rod 42 and the contact fitting 34 respectively. The rod 42 is electrically a portion of the conductor rod 14 centrally fitted within the end thereof for simplicity in fabrication.

Although the invention is not limited to a specific form of rectifier, a suitable arrangement comprises a germanium pellet contacted by a platinum-ruthenium whisker wire, one element being connected to the terminal pin 37 and the other to the terminal pin 38.

For bringing out an electrical connection to the direct-current instrument G and providing a voltage sample, a bridging resistor BR is provided extending through annular apertures 43 in the annular insulator 35 and the insulator 9 which carries the annular resistor SR, and an aperture 44 in the outside conductor 11. For making electrical connection at the inner end of the bridging resistor BR to the contact fitting 34, a threaded conductor socket 45 is provided. For connecting the outer end of the bridging resistor BR to the direct-current circuit of the direct-current instrument G, a coaxial connector 46 is provided having an externally threaded terminal 47 mounted in an internally threaded boss 48 welded, brazed, or otherwise connected to the outer surface of the outside conductor 11 at the opening 44 and having an insulated center pin terminal 49 carrying spring finger contacts 51, pressing on the surface of the outer end of the bridging resistor BR.

A conventional by-pass condenser 52 of the button type is provided having an external peripheral terminal connected to the terminal 47 and internal center annular terminal connected to the center pin 49. As shown schematically, the signal generator is connected at one end of the unit to the inner and outer conductor terminals of the coaxial connector 10 and likewise the load is connected to inner and outer terminals of the other connector 12.

For the sake of maximum compactness, preferably the internal diameter of the outside conductor is reduced at the ends toward the fittings 10 and 12 by the use of turnings 53 and 54 having tapered internal diameters 55 and 56 surrounding tapered external diameter portions 57 and 58 of the conductor rods 14 and 15 respectively. As shown, one of the turnings 54 is provided with a threaded insert 59 carrying one of the coaxial line fittings 12 and an O ring seal 60 in order that the space 61 within the outer conductor 11 may be filled with a suitable insulating fluid or liquid. Holes 62 may be provided in the outside conductor 11 for soldering or machine screws to secure the fittings 53 and 54.

As illustrated in Fig. 3, a radio frequency electrical circuit is formed by a wave source 63 at one end and a load 64 at the other end of the outer conductor 11 and the inner conductor means 14 and 15. For adjustment and calibration, a conventional reflection less termination 64 is used as the load in order to avoid reflection. The radio-frequency current traveling through the center conductor rods 14 and 15 and the interposed series resistor SR produces a voltage drop in the resistor SR which may be rectified and measured in the instrument G to give a current sample. A voltage sample circuit from the outer conductor 11 to the center conductor means is provided through the high resistance bridging resistor BR and the terminating resistor TR, the units SR and TR serving as a voltage divider to provide a voltage sample in the resistor TR which serves in conjunction with the current sample in the resistor SR to produce an indication which is a function of the power traveling through the insertion device. The current and voltage samples in resistors SR and TR are rectified by the rectifier 36 to produce a voltage across the by-pass condenser 52 which in this case serves as a peaking condenser as well as a by-pass condenser and the rectifier value is measured by the galvanometer or direct-current instrument G.

It will be understood that if it is desired to measure only current instead of power, the termination resistor TR may be replaced by a conductor rod. In this simplified, compact form of insertion device, the return direct-current electrical circuit for the instrument G is through the signal generator 63 itself. Accordingly in the event of use of an insertion device with a capacity coupled transmitter or high-frequency signal generator, an external direct-current return element of high radio frequency impedance would be connected across the transmission line from the transmitter or signal generator.

In accordance with the patent statutes, the principles of the present invention may be utilized in various ways, numerous modifications and alterations being contemplated, substitution of parts and changes in construction being resorted to as desired, it being understood that the article and apparatus shown in the drawings and described above and the particular method set forth are given merely for purposes of explanation and illustration without intending to limit the scope of the claims to the specific details disclosed.

What I claim and desire to secure by Letters Patent of the United States of America is:

1. In a reflectometer unit, outside and center coaxial conductors for insertion between a radio-frequency energy source and a radio-frequency load, the center conductor having a coaxial cylindrical chamber therein, extending between first and second ends, an annular resistor interposed in said center conductor intermediate the ends of the chamber, a contact fitting mounted within said annular resistor and insulated therefrom, said annular resistor having a radial aperture, the outside conductor having a radial aperture registering with the radial aperture in the annular resistor, a bridging resistor extending through said apertures from said contact fitting, a direct-current instrument connection fitting mounted on said outside conductor at the aperture therein with a by-pass condenser connected between said outside conductor and said bridging resistor, a rectifier in the first end of said chamber connected between said contact fitting and said center conductor, a terminating resistor extending coaxially in the second end of said chamber with respect to said contact fitting, having one end connected to said contact fitting and having a second end, a tapered bore conductor horn in said second end of the chamber with a small diameter end of the bore connected to the second end of said terminating resistor and with the larger diameter end of the bore connected to said center conductor at the junction of said center conductor with said annular resistor, said conductor horn being coaxial with said terminating resistor for forming the center conductor and the terminating resistor into a minor coaxial line, said conductor horn and said terminating resistor forming a reflectionless termination for said minor coaxial line.

2. Center conductor means for a coaxial line insertion type reflectometer comprising conductive rod means having a cylindrical chamber extending therein coaxial with the rod means and having first and second ends, a socket contact coaxially mounted in the first end of the chamber, an annular resistor interposed in said rod means intermediate the ends of the chamber for introducing series resistance in said conductive rod means, a contact fitting mounted within the annular resistor insulated therefrom, having a socket contact extending toward the first end of said chamber coaxial therewith, a rectifier having aligned terminal pins at the ends thereof, each mounted in one of said contact sockets for supporting said rectifier coaxially in the first end of said chamber, a tapered bore conductor horn mounted coaxially in the second end of said chamber, having an end at which the diameter of the bore is a maximum, electrically connected to said rod means, and having a second end at which the diameter of the bore is a minimum, extending toward the second end of said chamber but insulated therefrom, and a terminating resistor mounted between said contact fitting and the smaller diameter bore end of said connection unit coaxial with said unit and said rod means, electrically connected at one end to the contact fitting and at the other end to the conductor horn to form therewith a reflectionless termination for a minor coaxial line comprising said rod means and said terminating resistor, said annular resistor having a radial aperture therein for enabling electrical connections to be made thereto from externally.

3. Apparatus as in claim 2 comprising in combination therewith a bridging resistor extending from said contact fitting radially through said aperture in the annular resistor.

4. Apparatus as in claim 3 wherein a by-pass condenser is provided having a terminal connected to said bridging resistor at the radially extending end thereof and having a terminal adapted to be connected to the center conductor means.

5. In a coaxial line type reflectometer having an outer conductor, center conductor means therefor comprising a conductor rod having a coaxial chamber in one end thereof, said chamber having a closed end and an open end, an annular resistor mounted in the open end of said chamber electrically connected to the end of the conductor rod, a contact fitting mounted in the closed end of the chamber insulated therefrom, a second conductor rod having a coaxial chamber in one end thereof, said chamber having a closed end and an open end, with the open end electrically connected to said annular resistor, a rectifier connected between the closed end of the chamber in the first rod and the connection fitting, a conductor horn having a tapered bore mounted coaxially in the chamber in the second conductor rod, having a larger internal diameter end connected to the second conductor rod at the junction with the annular resistor, and having a smaller internal diameter end extending toward the closed end of the chamber in the second conductor rod, a terminating resistor coaxially mounted within the bore of said conductor horn electrically connected at one end to said connection fitting and at the other end to the smaller internal diameter end of the conductor horn, said annular resistor having a radial aperture for enabling a connection from an external direct-current circuit to be brought into said center conductor from externally.

6. Apparatus as in claim 5 wherein the conductor rods taper from a maximum external diameter in the portion surrounding said chambers to a minimum diameter at ends extending away from each other for mounting the center conductor means, an outside conductor having a central maximum diameter portion, and end inserts with internal diameters tapering to a minimum from said central maximum diameter portion.

No references cited.